United States Patent [19]
Whitney

[11] 3,881,683
[45] May 6, 1975

[54] GASKET FOR LENS MOLD

[75] Inventor: Donald B. Whitney, Southbridge, Mass.

[73] Assignee: American Optical Corporation, Southbridge, Mass.

[22] Filed: Nov. 29, 1973

[21] Appl. No.: 420,031

[52] U.S. Cl. ......... 249/117; 425/808; 425/DIG. 44; 249/154; 249/163
[51] Int. Cl. ..................... B29c 1/00; B29d 11/00
[58] Field of Search .................... 425/808; 249/117

[56] References Cited
UNITED STATES PATENTS

| | | | |
|---|---|---|---|
| 3,331,102 | 7/1967 | Migneu | 425/808 X |
| 3,761,208 | 9/1973 | Boudet et al. | 425/808 X |
| 3,806,079 | 4/1974 | Beattie | 425/808 X |

FOREIGN PATENTS OR APPLICATIONS

| | | | |
|---|---|---|---|
| 1,492,305 | 7/1967 | France | 425/808 |

Primary Examiner—J. Howard Flint, Jr.
Attorney, Agent, or Firm—H. R. Berkenstock, Jr.; William C. Nealon

[57] ABSTRACT

An annular gasket for molds used in the casting of minus power lenses. The gasket is provided with an internal flange having its opposite sides arranged as annular seats of appreciably different widths for receiving and supporting a pair of meniscus mold halves in a predetermined spaced coaxially aligned relationship. One mold half is used to form the concave ocular surface of a minus power lens to be cast and the seat supporting said one mold half is of greatest width for purposes of significantly reducing the diameter of the ocular surface and edge thickness of the cast lens.

4 Claims, 9 Drawing Figures

GASKET FOR LENS MOLD

BACKGROUND OF THE INVENTION

1. Field of the Invention

Molds for casting polymerizable resinous materials with particular reference to gaskets used in the casting of minus power lenses.

2. Description of Prior Art

Minus power lenses which are characteristically relatively thin at their center and thick at their edges have heretofore been difficult to cast with precision. Prior art casting techniques and apparatuses have been attended with problems of mold breakage, undue distortion of lens surfaces and/or occurrences of surface aberrations causing high scrap yield and excessive manufacturing costs. These problems are generally proportional to the edge-to-center thickness ratio of lenses being cast wherein lenses of greatest edge-to-center thickness ratios have the largest ocular (concave) surface areas and are the most difficult to cast with precision. Pulling forces created on mold halves which result from large amounts of shrinkage of casting monomers are generally proportional to the sizes, i.e., areas, of the surfaces of particular mold halves which are in contact with the monomer. These forces have, heretofore, caused breakage of one or another of the glass mold halves and/or caused premature release of the lens casting material. The latter tends to distort optical surfaces being cast whether full or partial release occurs. In cases of partial release, release line aberrations are usually formed. In all instances of the above, including mold breakage involving high replacement expenditures, the lenses are rendered inferior, if not completely unusable.

The aforementioned prior art problems of lens surface distortion or aberration and mold breakage in the casting of negative power ophthalmic lenses are overcome according to the present invention by uniquely reducing both the edge thickness and ocular surface area of lenses being cast without sacrifice of overall lens diameter or normal peripheral viewing angle of the finished lenses.

SUMMARY OF THE INVENTION

The reduction of edge thickness and ocular surface area of cast negative power lenses is accomplished according to the present invention by the incorporation of novel mold gaskets into lens casting molds. The gaskets are provided with internal flanges having their opposite sides arranged as annular seats or appreciably different widths for receiving and supporting pairs of meniscus mold halves in predetermined spaced coaxially aligned relationships. In each case, the seat of greatest width supports the mold half which is used to form the concave ocular surface of a minus power lens to be cast. These unusual seats significantly reduce the area of surface contact which the ocular mold halves make with lens casting materials and further significantly reduce edge thicknesses of the finally cast lenses.

The invention will be better understood from the following detailed description taken in conjunction with the accompanying drawings.

IN THE DRAWINGS

Figure 6:
Figure 7:
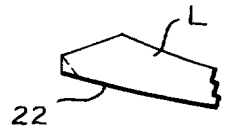
Figure 8:
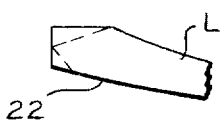
Figure 9:
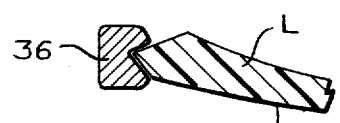

FIGS. 6, 7, and 8 are fragmentary cross-sectional views of lenses cast according to the present invention with section lines also omitted for clarity of illustration; and FIG. 9 is a fragmentary cross-sectional view of a lens and eyewire of an ophthalmic mounting wherewith a technique for mounting negative power lenses in spectacle frames is illustrated.

DESCRIPTION OF THE PREFERRED EMBODIMENTS

Figure 1:
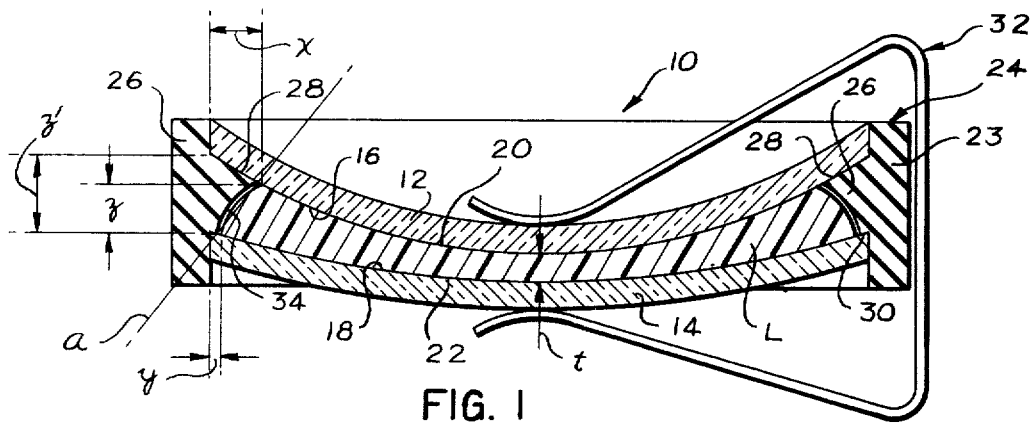
FIG. 1 is a cross-sectional view of a lens casting mold incorporating a preferred embodiment of the invention.

A lens mold 10 of the type used according to this invention for casting negative power lenses of liquid monomer is illustrated in FIG. 1. Mold 10 comprises a pair of meniscus mold halves 12 and 14 having convex and concave surfaces 16 and 18 respectively of curvatures which are complementary to the concave ocular and convex object surfaces of a lens L intended to be cast therebetween. These mold halves are preferably formed of glass.

Mold halves 10 and 12 are supported in coaxially aligned predetermined spaced relationship by gasket 24. The main body 23 of gasket 24 has inwardly directed flange 26 forming annular concave and convex seats 28 and 30 against which mold halves 12 and 14 are respectively held in place by a spring clamp 32. The center thickness t of the lens L to be cast in mold 10 is established by the thickness of flange 26, i.e., distance between 28 and 30 and the radii of curvatures of casting surfaces 16 and 18.

Lens L is formed by injecting a liquid plastic precursor between mold halves 12 and 14, i.e., by lifting an edge of one mold half or injecting through gasket 24. A highly desirable lens may be formed of a polymer produced from allyl diglycol carbonate, commonly referred to as CR-39. A catalyst (usually a peroxide) is added to the liquid monomer before injection into the mold assembly. Polymerization of the monomer is effected by subjecting the filled mold to relatively mild temperatures (e.g., 30° to 100°C) for suitable time periods of from 1-24 or more hours. Those interested in greater details of lens casting materials and curing cycles may refer to one or more of U.S. Pat. Nos. 3,674,587; 3,136,000; 2,890,486; and 2,728,106.

Gasket 24 is preferably formed of a resinous material such as polyvinyl chloride which contains a plasticizer such as tri-cresyl phosphate or dioctyl phthalate and to which may be added a stabilizer such as barium or cadmium and an oil to produce a gasket having desired flexibility. Increased flexibility may be obtained by adding more plasticizer and vice versa. Mixtures of ethylene copolymers may also be used as gasket material. These gasket materials are given by way of illustration only and form no direct part of the present invention other than to provide a gasket which is suitably flexible for lens casting purposes and which, when portions thereof are displaced or distorted, will tend to return to their initial set or shape.

Referring more particularly to a novel feature of the invention, the concave annular seat 28 of gasket 24 is of an appreciably greater width $x$ (FIG. 1) than the width $y$ of the convex seat 30. Thus, while the maximum diametral dimension of a lens L to be cast is established by the inner radial dimension of seat 30 as is usually the case in casting operations of this type, the surface area of the ocular side of lens L is appreciably reduced by the increased width of seat 28. At the same time, the edge thickness $z$ of a lens L cast in the mold of FIG. 1 is greatly reduced as can be appreciated by a comparison of the structure of FIG. 1 with the illustration of the prior art gasket 25 in FIG. 2.

The substantial reduction in edge-to-center thickness ratio of a lens L cast according to the invention minimizes prior art problems of mold breakage, premature full or partial release of lens casting material from mold halves and/or other such adversities heretofore causing excessive scrap yield and undue costliness in lens casting operations.

Figure 2:
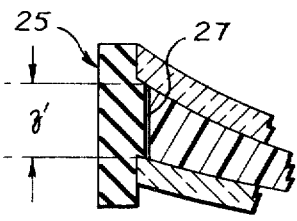
FIG. 2 is a fragmentary cross-sectional view of a prior art lens casting mold.

Referring more particularly to the FIG. 2 illustration of a typical prior art gasket, it can be seen that lenses have been cast with excessively large edge-to-center thickness ratios and consequently, with large areas of contact between the ocular surface of the lens and its corresponding mold halve.

In contrast, casting operations performed with gasket 24 of the invention reduce prior art radial dimensions of ocular surfaces by an amount equal to $x$ minus $y$ (FIG. 1) in each case and the lens edge thickness is reduced by an amount equal to $z'$ minus $z$ (FIGS. 1 and 2).

While the flange 26 of gasket 24 (FIG. 1) is illustrated as having its inwardly disposed inclined casting face 34 curved in the direction of its extension between seats 28 and 30, the invention contemplates the use of various other configurations. For example, gasket 24' of FIG. 3 has a concave obtusely angled rectilineal face 34' and gasket 24" of FIG. 4 has a right angularly shaped face 34". The use of a flat casting face 34 (not shown) is also contemplated. In all such cases, the improved result of reducing lens edge thickness and ocular surface area is accomplished according to the invention. The usual high shrinkage of lens casting material during its polymerization is prevented from exerting excessive pulling forces upon the mold halves thereby obviating problems of mold breakage and/or premature full or partial release of the lens material.

It is demonstrated in FIGS. 5–9 that the aforementioned advantages of the present invention may be accomplished without sacrifice of overall finished diameter of the cast lenses. When mounted in eyewires of spectacle frames, lenses are conventionally provided with beveled edges preferably having the apex of bevel disposed toward the forward or object surface 22 of the lens as shown in FIG. 9. Thus, in providing prior art cast negative power lenses with beveled edges, it has been customary to remove large portions of the cast lens generally as illustrated by broken lines in FIG. 5. This places the bevel adjacent to the convex object surface of the lens leaving little if any of the beveled edge of the lens directly visible from its front or object side 22 when mounted in a spectacle eyewire 36 (FIG. 9).

Similar aesthetics can be achieved with lenses L cast according to the present invention. FIG. 6 depicts a lens L of the type produced by using a gasket of the configuration shown in FIG. 1. When edged as shown by broken line illustration, the full diameter of its object surface 22 may be preserved and edging accomplished with considerably less removal of material than has been the case heretofore. This lessens edging time and correspondingly reduces machine wear and maintenance, all to economical advantage.

Figure 3:
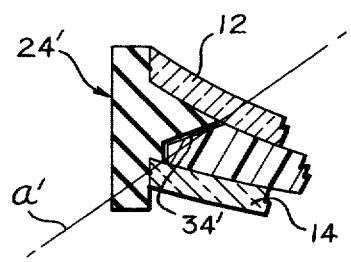
FIGS. 3 and 4 are fragmentary cross-sectional views of modifications of the invention.
Figure 4:
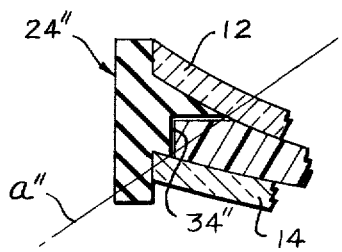
Figure 5:
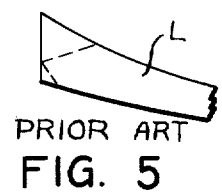
FIG. 5 is a fragmentary cross-sectional view of a lens cast according to prior art techniques with section lines omitted for clarity of illustration.

FIGS. 7 and 8 are illustrations of similar edging techniques applicable to lenses L of the types shown in FIGS. 3 and 4. In all cases, diameters of object surfaces 22 equal to those of prior art lenses may be preserved if desired.

It is to be understood that gaskets 24, 24' and 24" are adaptable to the casting of ocular surfaces 20 of lenses L which are either spherical or toroidal as determined by the shape of surface 16 of mold half 20.

In the casting of spherical ocular surfaces, the width $x$ of seat 28 is maintained constant throughout its annular extension by maintaining a constant angle of inclination of casting faces 34, 34', and 34" as determined by lines $a$, $a'$, and $a''$ respectively (FIGS. 1, 3, and 4).

In the casting of toroidal ocular surfaces, the width $x$ of seat 28 is maintained constant throughout its annular extension by varying the angle of inclination of casting faces 34, 34' or 34" gradually as required about the annular extension of flange 26.

The surface 22 of lens L may also be cast to either a spherical or a toroidal shape as determined by the shape of casting surface 18, the width of seat 30 being maintained substantially constant according to the aforementioned design parameters.

I claim:

1. In a lens casting mold including a pair of mold halves, one of said pair having a convex surface for molding concave ocular surfaces of lenses and the other of said pair having a concave surface for molding convex object side surfaces of the lenses and a resilient annular gasket for supporting said convex and concave surfaces of said mold halves in a predetermined spaced coaxially aligned relationship, the improvement comprising:

said gasket having an inwardly directed flange providing a seat for one of said mold halves at each of its opposite sides and said flange having an inclined inner rectilinear casting face of a concavely obtusely angled configuration along its extension from one of said seats to the other of said seats, said inclined casting face providing said one of said seats with an appreciably greater width than the other, said one seat of greater width being concavely shaped for receiving said convex molding surface of said one mold half and minimizing the area of contact between said convex molding surface and the ocular surfaces of lenses cast thereby and said other seat of lesser width being convexly shaped for receiving said concave molding surface of said other mold half and maximizing the diametral size of the convex object side surfaces of lenses cast thereby.

2. The improvement according to claim 1 wherein said inner casting face of said flange is of a concavely right angular configuration along the direction of its extension between said seats.

3. A gasket for supporting mold halves of a lens casting mold wherein a first mold half has a convex surface for molding the concave ocular surfaces of lenses to be cast a second mold half has a concave surface for molding the convex object side surfaces of the lenses, the gasket comprising:

an annular main body having an inwardly directed flange providing a seat for one of said mold halves at each of its opposite sides and said flange having an inclined rectilinear inner casting face of a concavely obtusely angled configuration along the direction of its extension from one of said seats to the other of said seats, said inclined casting face providing said one of said seats with an appreciably greater width than the other, said one seat of greater width being concavely shaped for receiving said convex molding surface of said first mold half and minimizing the area of contact between said convex molding surface and ocular surface of lenses cast thereby and said other seat of lesser width being convexly shaped for receiving said concave molding surface of said second mold half and maximizing the diametral size of the convex object side surfaces of lenses cast thereby.

4. A gasket according to claim 3 wherein said casting face of said flange is concavely right angular along its extension between said seats.

* * * * *